United States Patent
Izuta

(10) Patent No.: US 9,223,645 B2
(45) Date of Patent: Dec. 29, 2015

(54) STORAGE APPARATUS AND METHOD FOR CONTROLLING STORAGE APPARATUS

(75) Inventor: Hiroshi Izuta, Odawara (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/512,045

(22) PCT Filed: May 8, 2012

(86) PCT No.: PCT/JP2012/003013
§ 371 (c)(1),
(2), (4) Date: May 25, 2012

(87) PCT Pub. No.: WO2013/168192
PCT Pub. Date: Nov. 14, 2013

(65) Prior Publication Data
US 2015/0058658 A1   Feb. 26, 2015

(51) Int. Cl.
*G06F 11/00* (2006.01)
*G06F 11/07* (2006.01)
(Continued)

(52) U.S. Cl.
CPC ........ *G06F 11/0787* (2013.01); *G06F 11/0727* (2013.01); *G06F 11/0745* (2013.01);
(Continued)

(58) Field of Classification Search
CPC ............ G06F 11/0709; G06F 11/0724; G06F 11/0727; G06F 11/0772; G06F 11/0793; G06F 2213/0026
See application file for complete search history.

(56) References Cited

U.S. PATENT DOCUMENTS

| | | | |
|---|---|---|---|
| 7,096,308 B2 * | 8/2006 | Main et al. ..................... | 710/315 |
| 2008/0163005 A1 * | 7/2008 | Sonksen et al. ................. | 714/41 |

(Continued)

FOREIGN PATENT DOCUMENTS

| | | |
|---|---|---|
| JP | 2010061606 | 3/2010 |
| WO | 2010/116536 A1 | 10/2010 |

OTHER PUBLICATIONS

Solari et al., "PCI Express: Design & System Architecture", Jan. 1, 2005, figure 1.10, p. 435, paragraph 5—p. 436, Research Tech Inc., Nevada, USA.

*Primary Examiner* — Charles Ehne
(74) *Attorney, Agent, or Firm* — Volpe and Koenig, P.C.

(57) ABSTRACT

Provided is a storage apparatus and a method for controlling the storage apparatus which are capable of achieving both enhancement of data transfer processing efficiency and enhancement of apparatus availability. A storage apparatus including a storage medium for providing an external apparatus with a data storage area has a processing unit including a plurality of processors and a shared memory for storing programs executed by the processors and is configured such that the processors receive data I/O requests and store the data I/O requests in the shared memory as storage medium control information for the storage medium. The storage medium controller executes data processing of writing or reading target data for the corresponding data I/O processing request to or from the storage medium on the basis of the storage medium control information transmitted from the external apparatus. The data transfer controller executes data transfer processing between the processing unit and the storage medium controller in accordance with a predetermined communication method. When the storage medium controller transmits a data transfer request to the data transfer controller and the data transfer controller transfers the data transfer request from the storage medium controller to the processing unit, the data transfer controller sends the storage medium controller data including predetermined error information stipulated for the communication method when determining that the processing unit does not execute the data transfer processing normally, and the storage medium controller determines that a failure has occurred to the processor which is the target of the data transfer request transmitted to the data transfer controller when receiving the predetermined error information.

13 Claims, 11 Drawing Sheets

(51) Int. Cl.
*G06F 11/16* (2006.01)
*G06F 11/20* (2006.01)

(52) U.S. Cl.
CPC ........ *G06F11/0772* (2013.01); *G06F 11/0793* (2013.01); *G06F 11/167* (2013.01); *G06F 11/2007* (2013.01)

(56) References Cited

U.S. PATENT DOCUMENTS

2009/0307385 A1 12/2009 Hiramatsu et al.
2013/0170334 A1* 7/2013 Koinuma et al. ............. 370/216

* cited by examiner

TLP DATA STRUCTURE EXAMPLE

Poisoned TLP
EP = 0 → NO ERROR
EP = 1 → NON-FATAL ERROR

| TLP HEADER | DATA PAYLOAD | ECRC |

CONFIGURATION EXAMPLE OF MP PROCESSING REQUEST QUEUE

| MP8 | | | |
|---|---|---|---|
| MP IN CHARGE | COMMAND | ADDRESS | DATA LENGTH |
| MP1 | Write | XXXX | AAAA |
| | Read | YYYY | — |
| | ... | ... | ... |

STORAGE APPARATUS AND METHOD FOR CONTROLLING STORAGE APPARATUS

CROSS REFERENCE TO RELATED APPLICATION

This application claims priority to International Application No. PCT/JP2012/003013, filed May 8, 2012 which is incorporated by reference as if fully set forth.

TECHNICAL FIELD

The present invention relates to a storage apparatus and a method for controlling the storage apparatus.

BACKGROUND ART

A storage apparatus which provides a large data storage area by using a large number of storage media such as hard disk drives (hereinafter, HDDs) has been widely used. With the increase of the data storage area, the capacity of data of each file or the like stored therein has also been increasing, and a data transfer path used for data I/O has also been required to have a high-speed data transfer performance.

In such a storage apparatus, a storage control device controls data I/O between a host computer using the storage apparatus and each storage medium such as the HDD in the storage apparatus, i.e., controls processing for a data write request or a data read request from the host. The storage control device includes, for example, a microprocessor package (hereinafter, referred to as an "MPPK") and a data transfer controller. The MPPK includes a plurality of microprocessors (MPs) and a shared memory which is a storage device storing programs used by the MPs. The data transfer controller includes an application specific integrated circuit (hereinafter, referred to as an "ASIC") for controlling data transfer processing in the storage apparatus and a cache memory used as a temporary storage area for data in execution of processing for the data write request and processing for the data read request from the host computer.

The data transfer controller and the host computer are coupled with each other via a front-end interface unit (hereinafter, referred to as a "FIF" unit) which is an interface circuit between a communication network on the host computer side and an internal data transfer path on the storage apparatus side. Between the data transfer controller and the storage medium such as the HDD, there is provided a back-end interface unit (hereinafter, referred to as a "BIF" unit) which is an interface circuit between an internal data transfer path controlled by the data transfer controller and a data transfer path on the recording medium side. Specific configuration examples of the above components will be described later in an embodiment of the invention of the present application.

Instead of a conventional parallel transfer method using, for example, a PCI (Peripheral Component Interconnect) bus or the like, a serial transfer method represented by, for example, PCI Express (registered trademark, hereinafter referred to as "PCIe") has been employed for data transfer between the data transfer controller and each of the MPPK, the FIF unit, and the BIF unit. This is because the conventional parallel transfer method can no longer meet the requirements of high-speed data transfer due to technical problems such as difficulty in controlling signal synchronization timing. The entire contents of PCI Express Base Specification Revision 2.0, which is a PCIe technical standard stipulated by PCI-SIG (registered trademark, The Peripheral Component Interconnect Special Interest Group), are incorporated herein by reference.

The BIF unit is provided with a controller such for example as a SAS controller for controlling storage media coupled using an appropriate data transfer protocol such for example as Serial Attached SCSI (SAS). The SAS controller uses back-end interface control information (hereinafter, referred to as "BIF control information") which is control information to perform interface processing between SAS control information used for the storage medium and the data write request or the data read request controlled by the MPs. The BIF control information has conventionally been stored in a buffer memory provided in the BIF unit. This is because arranging the BIF control information used by the SAS controller within the same substrate (the same package), i.e., at a position very close to the SAS controller, is advantageous in the viewpoint of such as speeding up of data transfer processing.

However, in the case where the buffer memory is provided in the BIF unit, data temporarily stored in the cache memory is again stored temporarily in the buffer memory in the BIF unit in execution of the data read or write processing. Thus, the data read or data write processing has a problem of deteriorated data transfer efficiency. Hence, a method is devised in which the buffer memory is provided in the cache memory of the data transfer controller, and the BIF control information is stored in the buffer memory. However, from a control viewpoint, the BIF control information is preferably held as close as possible to either the BIF unit or the MP involved in data transfer processing. Thus, for making the data transfer processing efficient, it is found preferable to store the BIF control information in the shared memory in the MPPK.

In the configuration in which the BIF control information is arranged in the shared memory in the MPPK, a conceivable cause for a failure in proper execution of data transfer processing requested by the BIF unit is either a failure occurring in data transfer processing between the ASIC of the data transfer controller and the BIF unit or a failure occurring in one of the MPs which reads the BIF control information stored in the shared memory. In relation to failure detection in the data transfer processing using PCIe, Patent Literature 1, for example, describes a configuration in which when a communication failure occurs in a particular lane forming a data transfer path using PCIe, failure recovery can be achieved by using another lane.

CITATION LIST

Patent Literature

PTL 1: Japanese Patent Application Publication No. 2010-61606

SUMMARY OF INVENTION

Technical Problem

In a configuration of a storage apparatus used at present, even when a failure in an MP in the MPPK actually blocks a proper transfer of BIF control information, the storage apparatus with the current configuration may identify the cause for the blocking from the standpoint of the BIF unit wrongly by confusing the failure in the MP with a failure in data transfer processing between the ASIC of the data transfer controller and the BIF unit. Accordingly, although the BIF unit actually operates properly, the BIF unit is determined to be reset because a data transfer failure between the BIF unit and the ASIC is considered to occur. Since a data I/O request to a storage medium cannot be processed until the reset of the BIF unit is completed, there has been a problem that the storage apparatus inevitably operates at a low operating rate.

The present invention has been made to solve the aforementioned and other problems. A main object of the present invention is to provide a storage apparatus and a method for controlling the storage apparatus which are capable of achieving both enhancement of data transfer processing efficiency and enhancement of apparatus availability.

Solution to Problem

An aspect of the present invention for achieving the aforementioned object provides a storage apparatus including a storage medium for providing an external apparatus with a data storage area, the storage apparatus including a processing unit including a plurality of processors and a shared memory for storing programs executed by the processors and configured such that the plurality of processors receive data I/O requests and store the data I/O requests in the shared memory as storage medium control information for the storage medium, a storage medium controller configured to execute data processing that writes or reads target data for a corresponding one of the data I/O processing requests to or from the storage medium on the basis of the storage medium control information transmitted from the external apparatus, and a data transfer controller configured to execute data transfer processing between the processing unit and the storage medium controller in accordance with a predetermined communication method, wherein when the storage medium controller transmits a data transfer request to the data transfer controller and the data transfer controller transfers the data transfer request from the storage medium controller to the processing unit, the data transfer controller sends the storage medium controller data including predetermined error information stipulated for the communication method that writes or reads target data for a corresponding one of the data I/O processing requests to or from the storage medium, and the storage medium controller determines that a failure has occurred to the processor being a target of the data transfer request transmitted to the data transfer controller when the storage medium controller receives the predetermined error information.

In addition, another aspect of the present invention for achieving the aforementioned object provides a method for controlling a storage apparatus including a storage medium for providing an external apparatus with a data storage area, the storage apparatus further including a processing unit including a plurality of processors and a shared memory for storing programs executed by the processors and configured such that the plurality of processors receive data I/O requests and store the data I/O requests in the shared memory as storage medium control information for the storage medium, a storage medium controller configured to execute data processing that writes or reads target data for a corresponding one of the data I/O processing requests to or from the storage medium on the basis of the storage medium control information transmitted from the external apparatus, and a data transfer controller configured to execute data transfer processing between the processing unit and the storage medium controller in accordance with a predetermined communication method, the method including when the storage medium controller transmits a data transfer request to the data transfer controller and the data transfer controller transfers the data transfer request from the storage medium controller to the processing unit, sending data including predetermined error information to the storage medium controller by the data transfer controller, the predetermined error information being stipulated for the communication method when the data transfer controller determines that the processing unit does not execute the data transfer processing properly, and determining by the storage medium controller that a failure has occurred to the processor being a target of the data transfer request transmitted to the data transfer controller when the storage medium controller receives the predetermined error information.

In addition, problems and a method for solving the problems disclosed in the present application will be made clear from the section of the description of embodiments and the drawings.

Advantageous Effects of Invention

According to the present invention, there can be provided a storage apparatus and a method for controlling the apparatus which are capable of achieving both enhancement of data transfer processing efficiency and enhancement of apparatus availability.

DESCRIPTION OF EMBODIMENT

Configuration of Storage Apparatus 1

Figure 1:
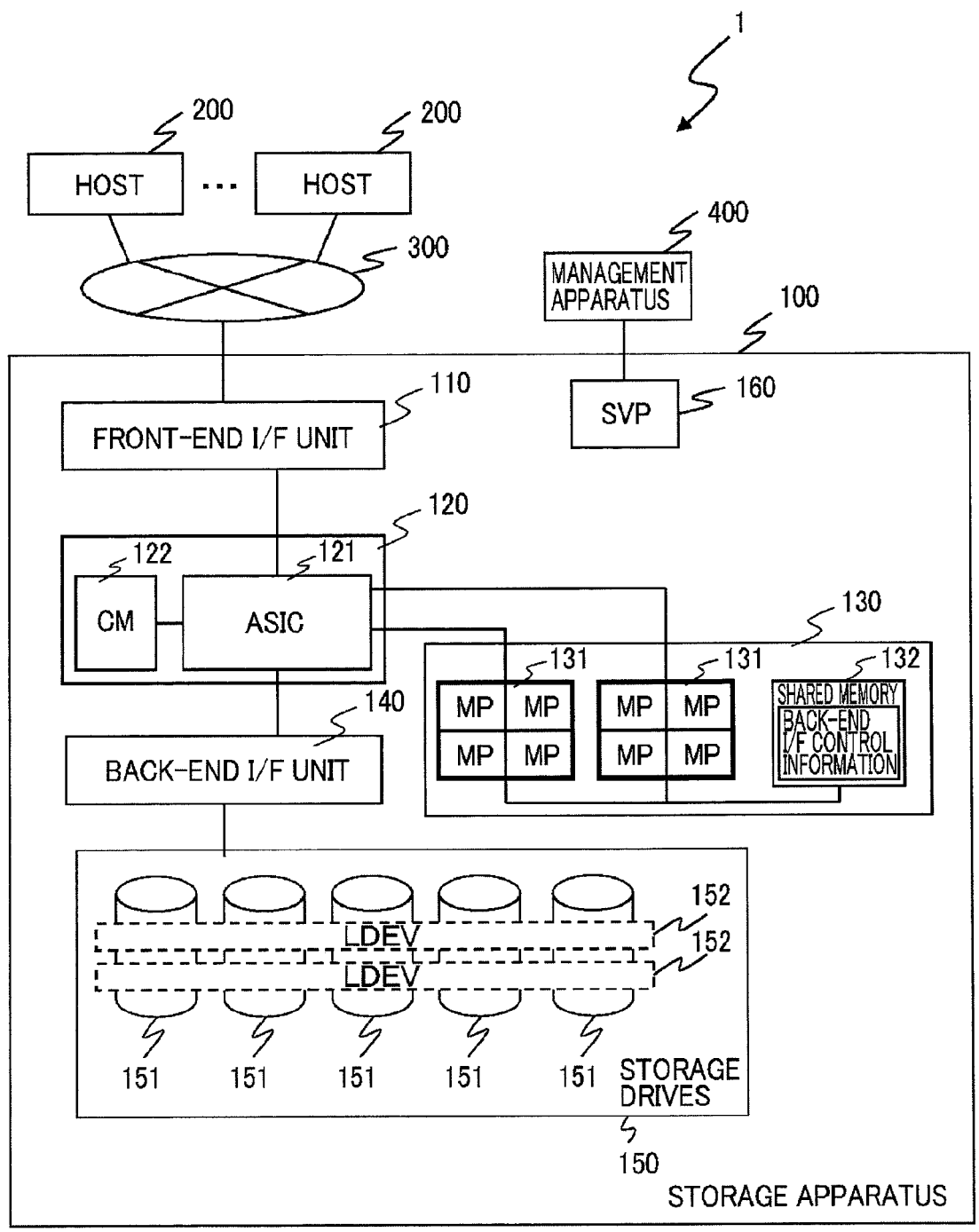
FIG. 1 is a diagram showing a schematic configuration of a storage apparatus 1.

An embodiment will be described below while referring to the accompanying drawings. FIG. 1 shows a schematic configuration of a storage system 1 to be described as the embodiment. As shown in FIG. 1, one or more host computers 200 (hereinafter, referred to as "hosts 200") which are external apparatuses are coupled to a storage apparatus 100 through a communication network 300 in the storage system 1. Note that an example in FIG. 1 shows the single storage apparatus 100, but another one or more storage apparatuses 100 may be coupled to the communication network 300.

The communication network 300 is a LAN (Local Area Network), a WAN (Wide Area Network), a SAN (Storage Area Network), the Internet, a public communication network, a lease line or the like. The communication through the communication network 300 is performed in accordance with a protocol of, for example, TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark) or the like.

Each of the hosts 200 is an information apparatus (a computer) using a storage area (a data storage area) provided by the storage apparatus 100. The host 200 is configured by using a personal computer, a mainframe, an office computer or the like. When accessing the storage area, the host 200 transmits a data frame (hereinafter, abbreviated to frame) including a data I/O request (a data write request, a data read request or the like) to the storage apparatus 100.

The storage apparatus 100 is a disk array apparatus, for example. The storage apparatus 100 accesses one of storage media in response to the aforementioned I/O request transmitted from the host 200 and transmits data or a response to the host 200. The storage apparatus 100 includes one or more front-end interface units (FIF units) 110, a data transfer controller 120, a microprocessor package (MPPK) 130 (a processing unit), one or more back-end interface units (BIF units) 140 (storage media controllers), a storage device 150, and a service processor (hereinafter, SVP) 160.

Figure 2:
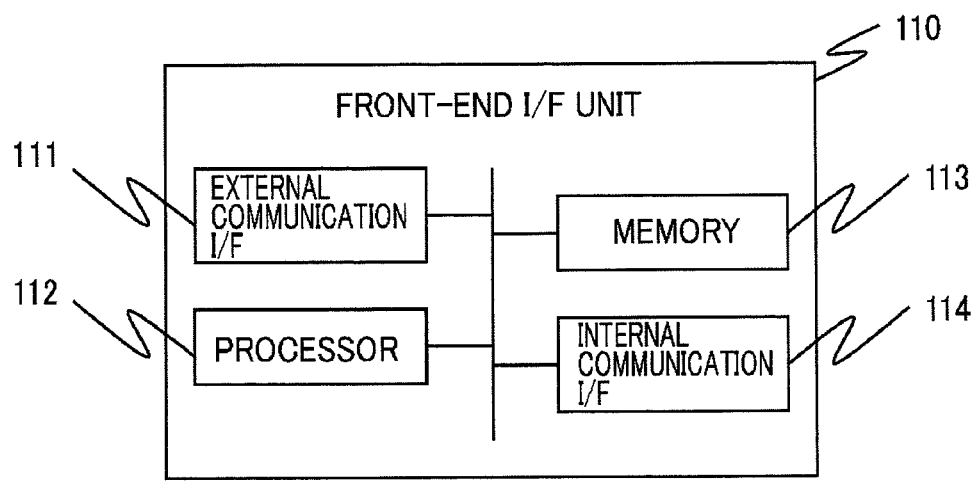
FIG. 2 shows an example of a hardware configuration of a front-end I/F unit 110.

The FIF unit 110 receives a frame sent from the host 200, and sends the host 200 a frame including a response (for example, read data, a read completion report or a write completion report) concerning processing for a data I/O request included in the received frame. Note that description is given on the assumption that a frame is a frame of a fibre channel (FC frame). FIG. 2 shows an example of a hardware configuration of the FIF unit 110. As shown in FIG. 2, the FIF unit 110 includes an external communication interface (hereinafter, external communication I/F) 111 having a port (a communication port) configured to communicate with the host 200 and an internal communication interface (hereinafter, an "internal communication I/F") 114 having a port (communication port) configured to communicate with a processor 112, a local memory 113, and the like.

The external communication I/F 111 is configured by using an NIC (Network Interface Card), an HBA (Host Bus Adaptor), and the like according to the type of the coupled communication network 300. The processor 112 is configured by using a CPU (Central Processing Unit), an MPU (Micro Processing Unit) or the like. The local memory 113 is a RAM (Random Access Memory) or a ROM (Read Only Memory). The local memory 113 stores a micro program for implementing a function of the FIF unit 110. The processor 112 reads and executes the aforementioned micro program from the local memory 113, and thereby various functions provided by the FIF unit 110 are implemented. The internal communication I/F 114 communicates with an ASIC 121 of the data transfer controller 120 through an internal communication path. This embodiment uses PCIe as the internal communication I/F.

Figure 3:
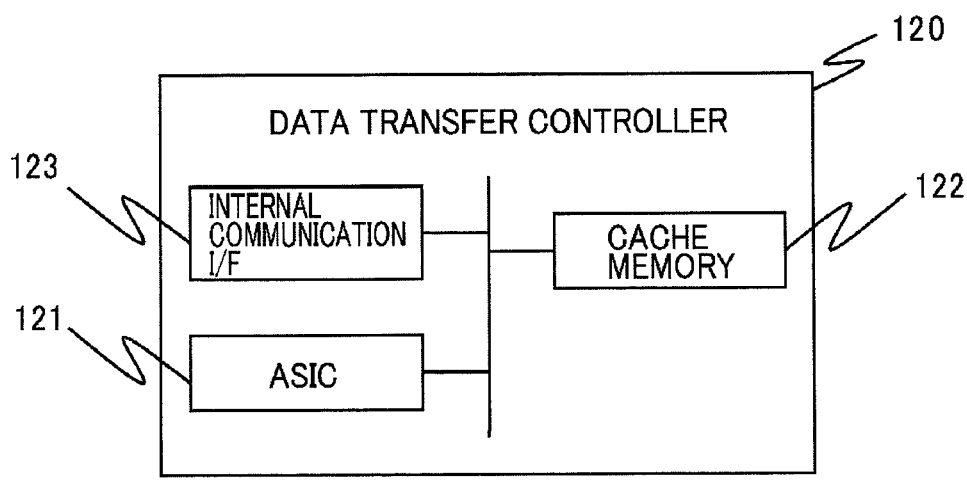
FIG. 3 shows an example of a hardware configuration of a cache memory 122 and a shared memory 132.

As shown in FIG. 3, the data transfer controller 120 includes an ASIC 121 configured to control data transfer processing in the storage apparatus 100 using PCIe, a cache memory 122, and an internal communication I/F 123. The ASIC 121 is communicatively coupled to the FIF unit 110, the MPPK 130, and the BIF unit 140 through the internal communication I/F 123, and controls data transfer processing executed between these components by using PCIe. Specifically, the ASIC 121 performs: handover of data between the FIF unit 110 and the BIF unit 140 (data read from the storage device 150 and data written to the storage device 150); and staging (reading data from the storage device 150) of data to be stored in the cache memory 122 or destaging (writing the data to the storage device 150); and the like by Direct Memory Access (DMA), for example. The cache memory 122 is a storage device used as a temporary storage area for data transferred between the host 200 and the storage device 150 based on processing for the data write or data read request from the host 200.

Figure 4:
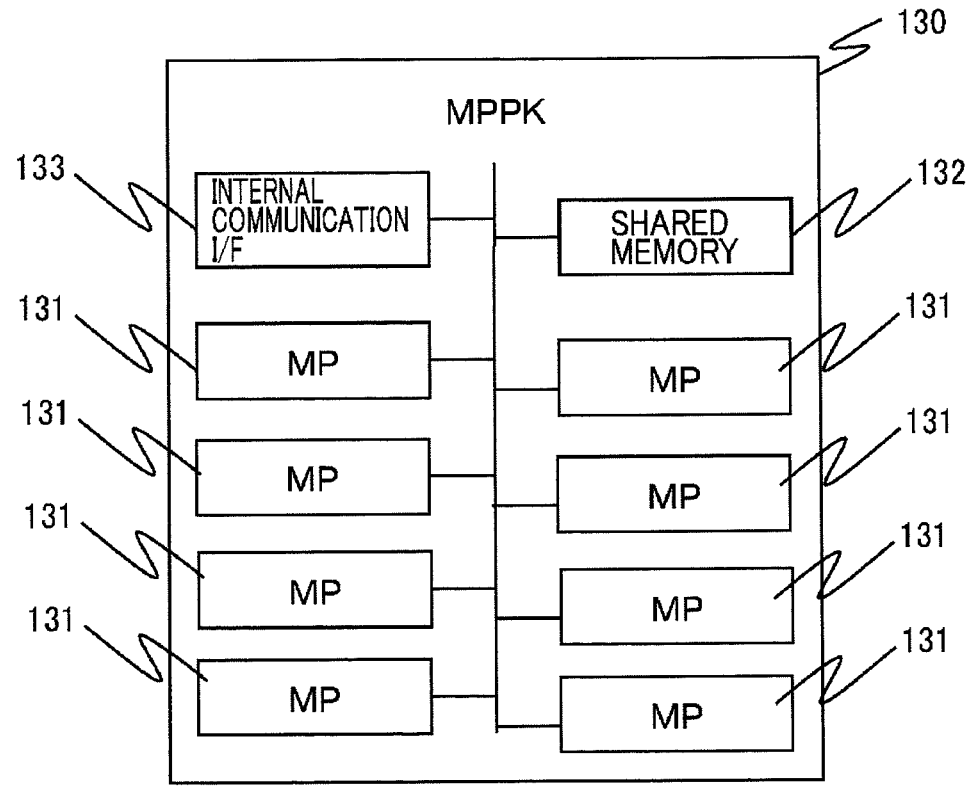
FIG. 4 shows an example of a hardware configuration of MPs 131.

The MPPK 130 performs processing for the data I/O request between the FIF unit 110 and the BIF unit 140 in response to the data I/O request included in a frame received by the FIF unit 110. FIG. 4 shows an example of a hardware configuration of the MPPK 130. The MPPK 130 includes a plurality of microprocessors (hereinafter MPs) 131, a shared memory 132, and an internal communication I/F 133. As also illustrated in FIG. 1, four of the MPs 131 form a group, and thus a total of eight MPs 131 in two groups are provided in this embodiment. The MPs 131 are responsible for sharing processing for requests for data write to or data read relating to logical volumes assigned as logical storage areas by the host 200. In addition, a representative one of the MPs 131 which is selected in advance in each group executes data processing necessary for the storage apparatus 100, such as failover processing to be performed in a case of occurrence of a failure in any MP 131. The shared memory 132 stores a program for achieving a function to be executed by the MPs 131. The internal communication I/F 133 communicates with the ASIC 121 of the data transfer controller 120 through an internal communication path.

Figure 5:
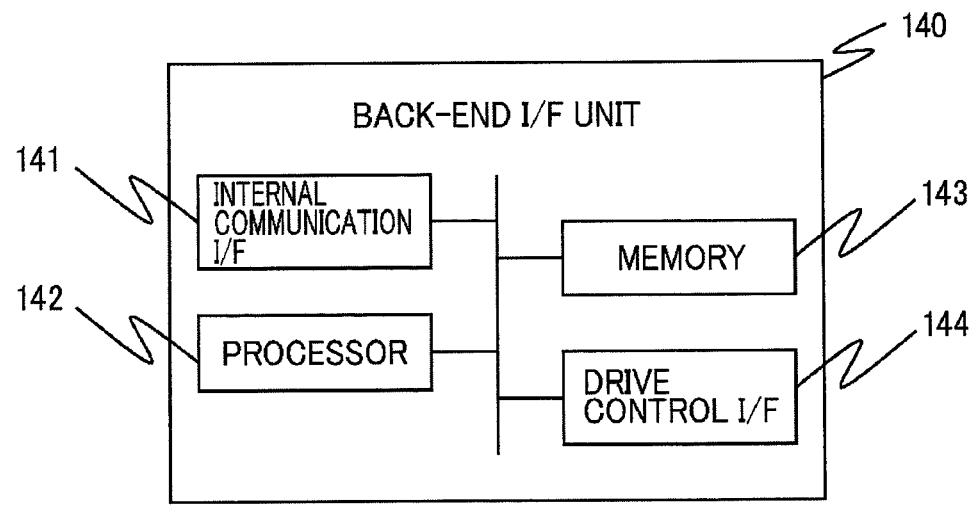
FIG. 5 shows an example of a hardware configuration of a back-end I/F unit 140.

The BIF unit 140 communicates with the storage device 150 in reading data from the storage device 150 and in writing data to the storage device 150. FIG. 5 shows an example of a hardware configuration of the BIF unit 140. The BIF unit 140 includes an internal communication I/F 141, a processor 142, a local memory 143, and a drive control interface (hereinafter, a "drive control I/F") 144. The local memory 143 stores therein a micro program. The processor 142 reads and executes the aforementioned micro program from the local memory 143, and thereby various functions as well as a SAS control which are provided by the BIF unit 140 are implemented. The internal communication I/F 141 communicates with the ASIC 121 of the data transfer controller 120 through an internal communication path. The processor 142 is configured by using a CPU, an MPU or the like. The local memory 143 is a RAM or ROM, for example. The drive control I/F 144 communicates with the storage device 150 by using a predetermined method which is a SAS method in the present embodiment. In the present embodiment, BIF control information which is control information used by the BIF unit 140 serving as the SAS controller is stored in the shared memory 132 of the MPPK 130.

The storage device 150 includes a plurality of storage drives 151. Each of the storage drives 151 is an HDD of a SAS type. The storage drive 151 can also be configured by an HDD of another type such as SATA (Serial ATA), FC (Fibre Channel), PATA (Parallel ATA) or SCSI, or a semiconductor memory (Solid State Drive, hereinafter an "SSD"). Note that the FIF unit 110, the data transfer controller 120, the MPPK 130, the BIF unit 140, and the storage device 150 are generally provided in two or more sets to provide a configuration redundancy of the storage apparatus 100.

The storage device 150 provides storage areas in units of logical storage volumes provided by controlling the storage drives 151 in accordance with a method such as RAID (Redundant Arrays of Inexpensive (or Independent) Disks). Each of the logical storage volumes is a logical device (LDEV) 152 including, for example, a RAID group (a parity group). The storage apparatus 100 also provides the host 200 with logical volumes configured by using the LDEVs 152. The storage apparatus 100 manages correspondence (a relationship) between the logical volumes and the LDEVs 152. Based on the correspondence, the storage apparatus 100 identifies a LDEV 152 corresponding to the logical volume or a logical volume corresponding to the LDEV 152.

The SVP 160 controls each component of the storage apparatus 100 or monitors a state of the component. The SVP 160 is a personal computer, an office computer or the like. The SVP 160 communicates whenever necessary with the components of the storage apparatus 100, such as the FIF unit 110, the data transfer controller 120, the MPPK 130, and the BIF unit 140, through communication means such as an internal communication path or a LAN. And the SVP 160 acquires operating information and the like from each component and provides a management apparatus 400 with the information and the like. The SVP 160 performs setting, control, and maintenance (including introduction and update of software) of each component based on the control information and operating information sent from the management apparatus 400.

Figure 6:
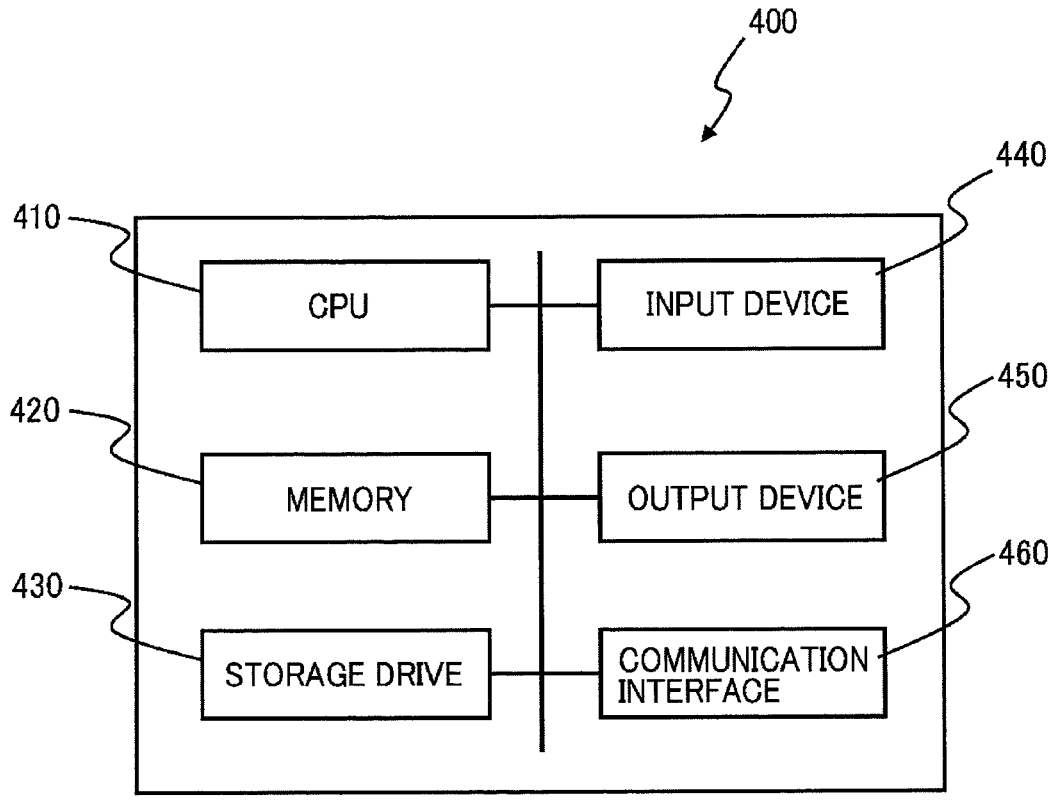
FIG. 6 shows an example of a hardware configuration of a management apparatus 400.

The management apparatus 400 is a computer configured to execute initial setting, manipulation inputting, monitoring of an operation state, and the like of the storage apparatus through the SVP 160 of the storage apparatus 100. FIG. 6 shows a hardware configuration example of the management apparatus 400. As illustrated in FIG. 6, the management apparatus 400 includes a CPU 410, a memory 420, a storage drive 430, an input device 440, an output device 450, and a communication interface 460.

The CPU 410 may be a CPU or instead another arithmetic operation device such as an MPU. The memory 420 is a memory which stores various programs for implementing a function as the management apparatus 400, parameters used during execution of each of the programs, and data of various tables and the like. The memory 420 is configured by a memory device such as a ROM, a RAM or a flash memory. The storage drive 430 is a secondary storage and can be configured by an appropriate storage device including an HDD, an SSD, and the like. The input device 440 is a data input device used by a general computer and can include an appropriate input device selected from, for example, a keyboard, a mouse, a touch screen, a pen tablet, and the like. The output device 450 is a data output device used by a general computer and can include an appropriate output device such as a display monitor or a printer, for example. The communication interface 460 is an interface circuit such as an NIC, for example.

Figure 7:
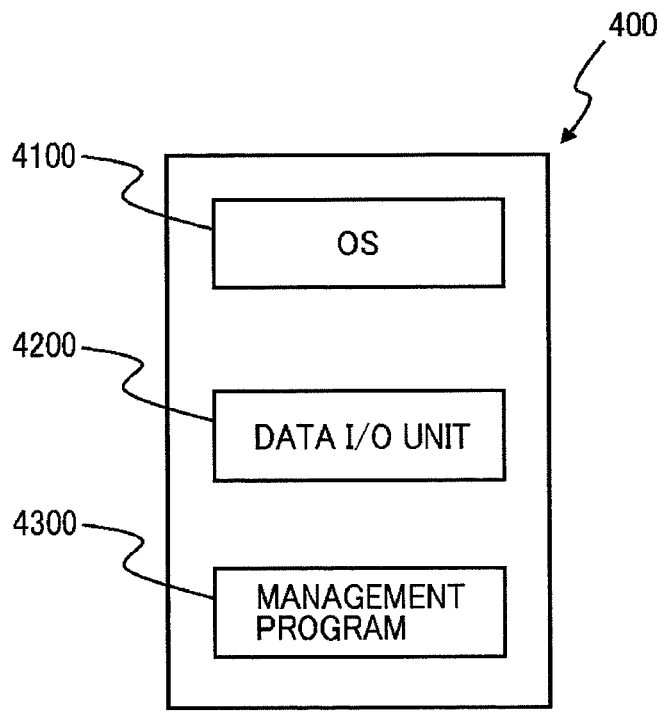
FIG. 7 shows an example of a software configuration of the management apparatus 400.

FIG. 7 shows a software configuration example of the management apparatus 400. As shown in FIG. 7, the management apparatus 400 includes an operating system (OS) 4100, a data I/O unit 4200, and a management program 4300. The OS 4100 is basic software on which the various programs are executed in the management apparatus 400, and can be used after being selected from various OSs generally used as an OS of a computer. The data I/O unit 4200 is a program that manages data input/output (data I/O) from/to each program under control of the OS 4100, the program running on the management apparatus 400. The management program 4300 is an application program for implementing the function as the aforementioned management apparatus 400.

Figures 8, 9:
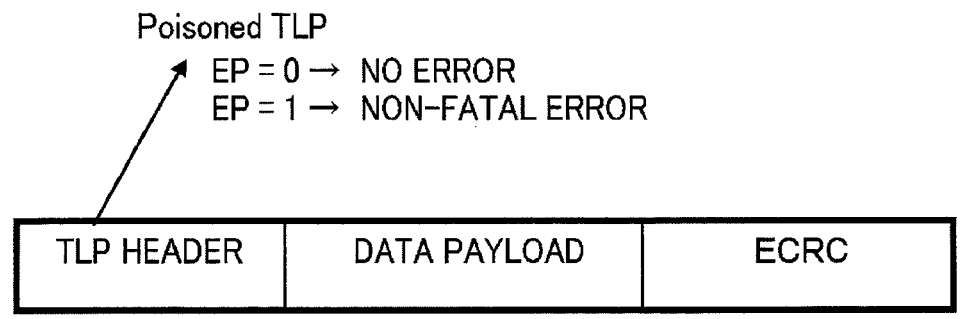
FIG. 8 shows a data structure example of a transaction layer packet transferred by PCIe.
FIG. 9 shows an example of a queue configuration of an MP processing request stored in the shared memory 132.

Next, a description is given of an example of a data configuration of PCIe used for internal data transfer in the storage apparatus 100 in the present embodiment. FIG. 8 shows an example of TLP data structure in a transaction layer of PCIe. In PCIe, data is transmitted and received by using a data packet having a predetermined length. TLP data in the transaction layer includes sections of a TLP header, a data payload, and an ECRC. The TLP header includes a data bit EP called a Poisoned TLP as well as a destination of data, an address of a source, and the like. The data bit of the Poisoned TLP indicates whether or not a transfer error which is not a fatal error, being minor compared to a fatal error has occurred. In a fatal error, data transfer processing itself is not executed normally. The user can use the data bit for any purpose. The non-existence of an error is indicated by EP=0, and occurrence of a non-fatal is indicated by EP=1. In the present embodiment, the information of the Poisoned TLP is utilized to determine whether a failure occurring in data transfer processing between an ASIC of a data transfer controller and a BIF unit or a failure occurring in an MP reading BIF control information stored in a shared memory results in a case where data transfer processing requested by the BIF controller is not normally executed.

Next, a description is given of a queue of processing requests to be processed by the MPs 131 in the MPPK 130. The host 200 transmits processing requests including a request for data write, read, and the like through the FIF unit 110, the processing requests being made to the storage apparatus 100. The ASIC 121 of the data transfer controller 120 and the MPs 131 of the MPPK 130 store these processing requests as queues on an MP 131 basis in the shared memory 132 provided in the MPPK 130. FIG. 9 shows a configuration example of each of the queues of the MP processing requests. For example, the processing request queue includes an MP in charge, a command to be executed, an execution target address, and a data length of a processing target, but may include items other than these as appropriate. An example in the top row in FIG. 9 shows a processing request requesting an MP 1 of the eight MPs 131 mounted on the MPPK 130 to perform write processing on data having a data length AAAA from a start address XXXX of a corresponding logical volume. As to be described later, the BIF unit 140 including, for example, a SAS controller can acquire details of processing to be executed by the BIF unit 140 for the storage device 150 by accessing the processing request queue. The processing request queue is included in the BIF control information stored in the shared memory 132 of the MPPK 130. In addition to this, the BIF control information also includes SAS controller setting information to which the SAS controller of the BIF unit 140 refers.

Next, a description is given of data I/O processing executed on the storage device 150 by the storage apparatus 100 having the above-described configuration. The data I/O processing is general processing executed by the storage apparatus 100.

Figure 10:
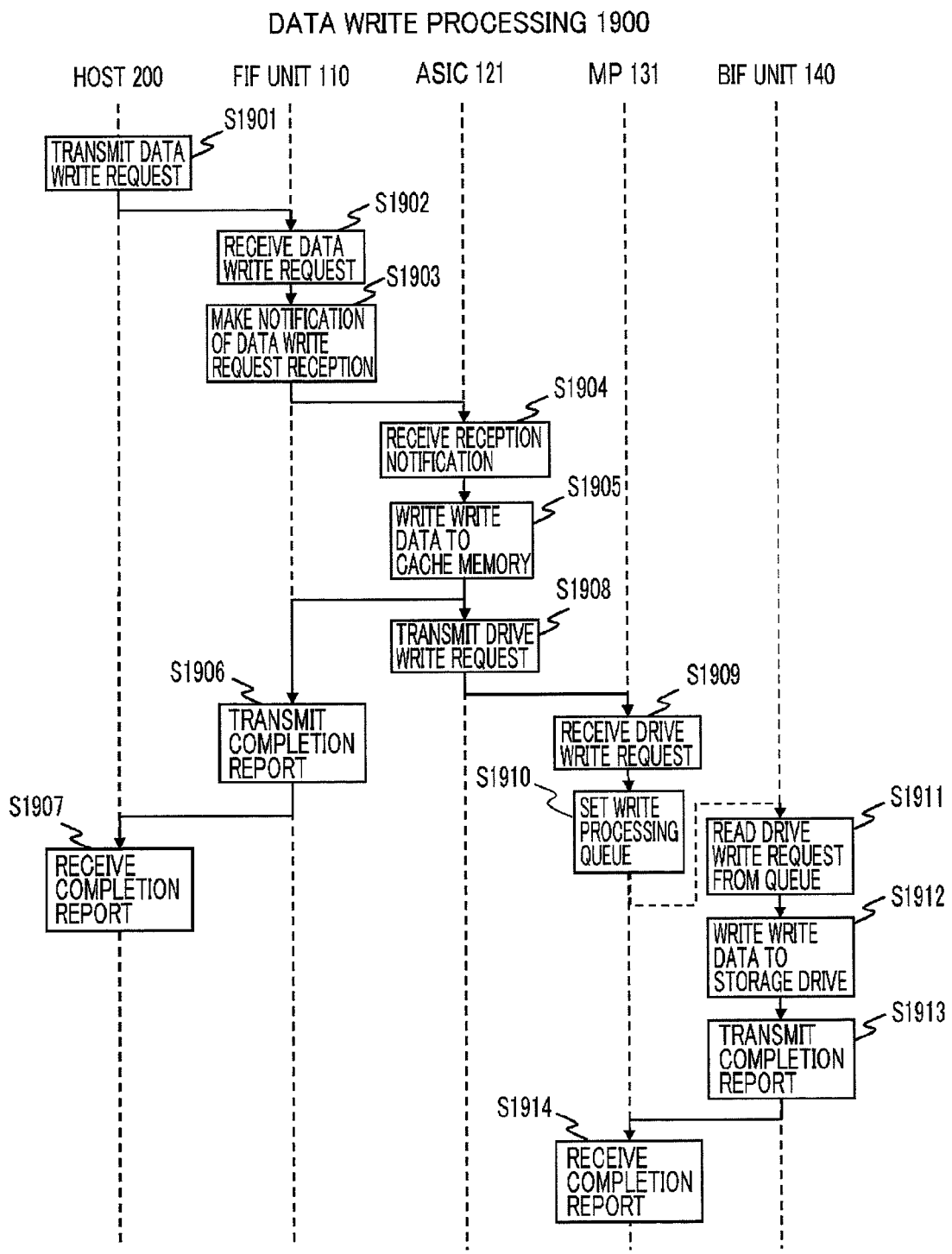
FIG. 10 is a diagram showing an example of a data write processing flow.

FIG. 10 is a flowchart for explaining processing (hereinafter, "data write processing 1900") executed in a case where the storage apparatus 100 receives a frame including a data write request from one of the hosts 200. The data write processing 1900 will be described below with reference to FIG. 10. Note that in the following description, a letter "S" prefixed to a code means step.

The FIF unit 110 of the storage apparatus 100 receives the frame transmitted from the host 200 (S1901 and S1902).

Upon receipt of the frame, the FIF unit 110 notifies the ASIC 121 of the data transfer controller 120 to that effect (S1903).

Upon receipt of the notification from the FIF unit 110 (S1904), the ASIC 121 generates a drive write request based on the data write request in the frame and stores the generated drive write request in the cache memory 122. The ASIC 121 transmits the generated drive write request to one of the MPs 131 which is in charge of the processing (S1908). The FIF unit 110 transmits a completion report to the host 200 (S1906), and the host 200 receives the completion report (S1907).

Upon receipt of the drive write request, the MP 131 registers the drive write request in a processing request queue of the MP 131 (S1909 and S1910). The BIF unit 140 reads the drive write request from the processing request queue whenever necessary (S1911). The BIF unit 140 reads write data designated in the thus read drive write request from the cache memory 122 and writes the thus read write data to a corresponding one of the storage drives 151 (S1912).

Next, the BIF unit 140 notifies the MP 131 of a report (a completion report) to the effect that write of the write data is completed in response to the drive write request (S1913), and the MP 131 receives the transmitted completion report (S1914).

Figure 11:
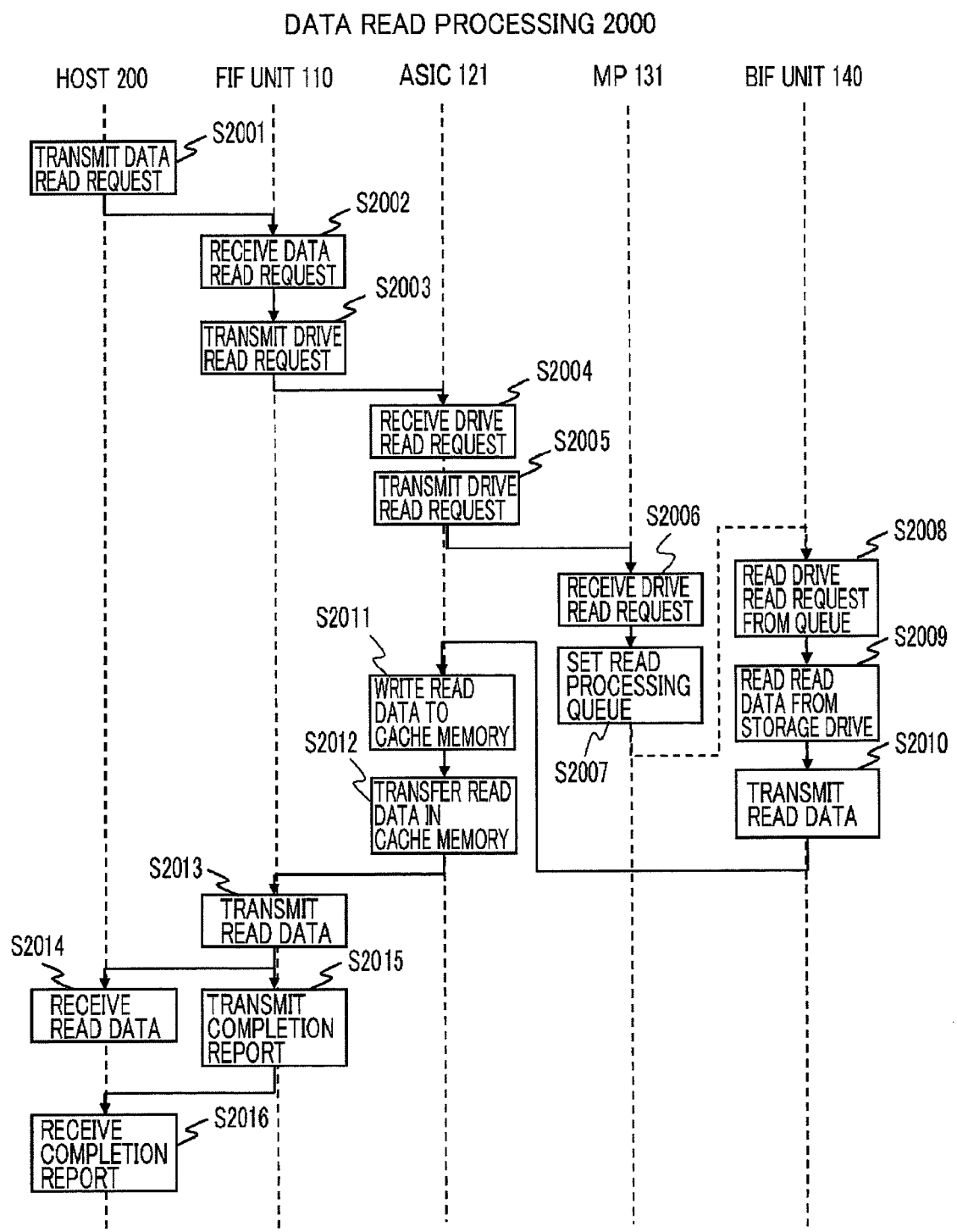
FIG. 11 is a diagram showing an example of a data read processing flow.

FIG. 11 is a flowchart for explaining I/O processing (hereinafter, "data read processing 2000") to be performed in the storage apparatus 100 in a case where the storage apparatus 100 receives a frame including a data read request from the host 200. The data read processing 2000 will be described below with reference to FIG. 11.

The FIF unit 110 of the storage apparatus 100 receives the frame transmitted from the host 200 (S2001 and S2002). Upon receipt of the frame from the host 200, the FIF unit 110 notifies the ASIC 121 to that effect (S2003).

Upon receipt of the notification from the FIF unit 110, the ASIC 121 transmits a drive read request to the MP 131 in charge designated in the read request (S2004 and S2005). The MP 131 receiving the drive read request sets the data read request in a request processing queue of its own (S2006 and S2007).

The BIF unit 140 reads the drive read request whenever necessary from the processing request queue included in the BIF control information stored as BIF control information in the shared memory 132, and reads data designated in the data read request (designated by a LBA (Logical Block Address), for example) from a corresponding one of the storage drives 151 (S2008 and S2009). The BIF unit 140 transmits the read data to the ASIC 121 (S2010). The ASIC 121 writes the data read by the BIF unit 140 to the cache memory 122 (S2011). The ASIC 121 transfers the data written in the cache memory 122 to the FIF unit 110 whenever necessary (S2012). Note that in a case where read data exists in the cache memory 122 (in a case of a cache hit), the processing of reading data from the storage drive 151 (S2005 to S2011) is omitted.

The FIF unit 110 sends the host 200 in turn the read data transmitted from the ASIC 121 (S2013 and S2014). Upon completion of the transmission of the read data, the FIF unit 110 transmits a completion report to the host 200 (S2015), and the host 200 receives the transmitted completion report (S2016).

Figure 12:
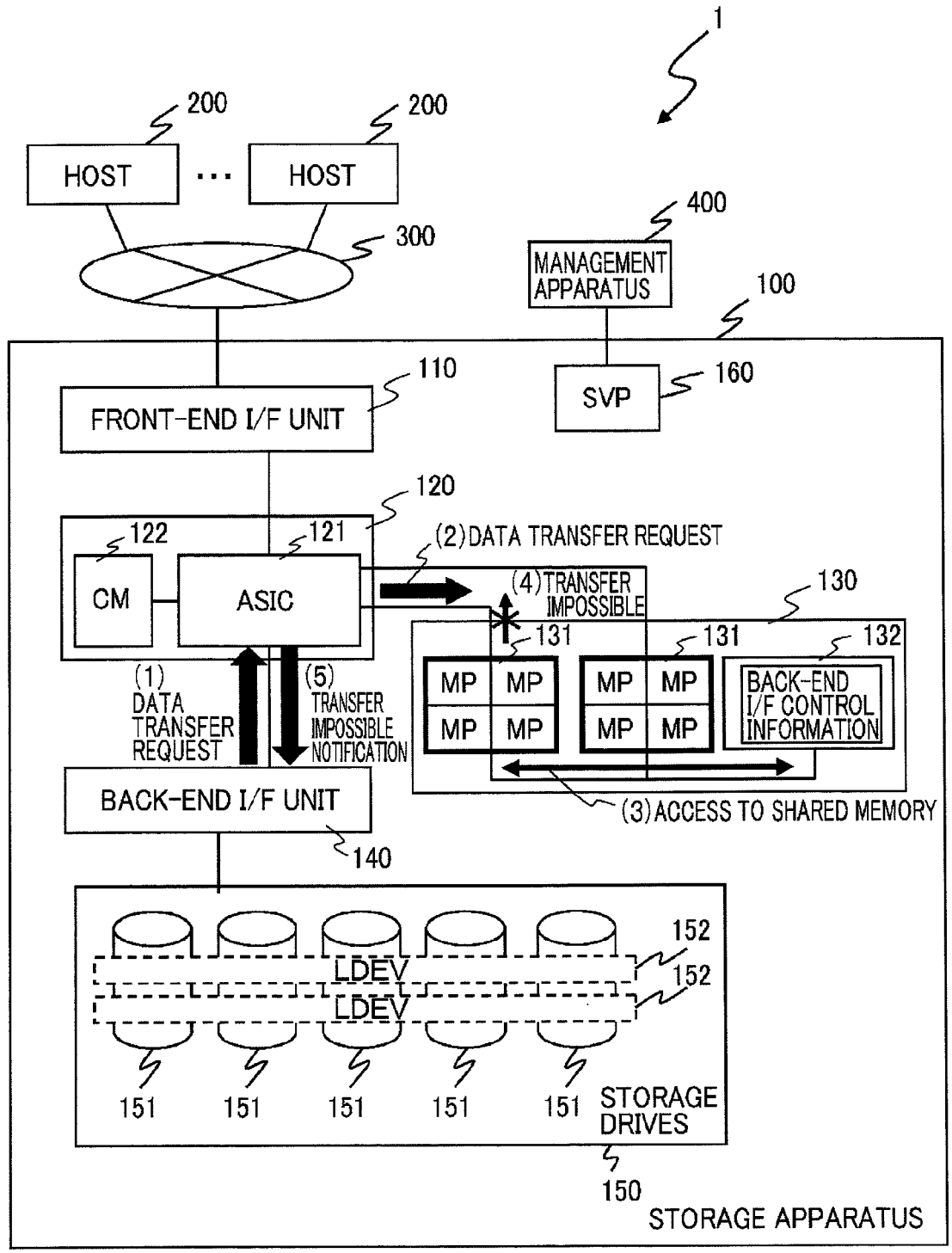
FIG. 12 is a diagram showing an overview of remedy processing for a data transfer failure in the storage apparatus 1 in the present embodiment.

Next, a description is given of data transfer processing in the storage apparatus 100 according to a method for controlling a storage apparatus in the present embodiment. First, FIG. 12 schematically shows an overview of the data transfer processing in the configuration of the storage apparatus 100 shown in FIG. 1. As described by using FIGS. 10 and 11, in executing processing for a data write or read request from the host 200, the BIF unit 140 accesses the BIF control information stored in the shared memory 132 in the MPPK 130. When the BIF unit 140 accesses the BIF control information in the shared memory 132, more specifically, accesses the processing request queue (see FIG. 9) which is part of the BIF control information, the data transfer processing using PCIe is executed among the BIF unit 140, the ASIC 121, and the MP 131 as schematically shown in FIG. 12. However, FIG. 12 illustrates an overview of processing performed in a case where a failure occurs in the MP 131 in charge of the corresponding processing request queue when the data transfer processing is executed.

Firstly, the BIF unit 140 transmits a data transfer request to the ASIC 121 (arrow (1) in FIG. 12). In response to this, the ASIC 121 transfers the data transfer request to one of the MPs 131 (arrow (2)). The MP 131 receiving the data transfer request accesses a processing request queue of the MP 131 in the BIF control information arranged in the shared memory 132 (arrow (3)). At this time, which one of the MPs 131 in the MPPK 130 is to receive the data transfer request can be identified by the BIF unit 140. The corresponding MP 131 is identified as the one in charge of a logical volume which is a processing target of a data I/O request from the host 200. Then, when the MP 131 in charge operates normally, the MP 131 transfers a corresponding processing request in the processing request queue to the BIF unit 140 via the ASIC 121.

The example in FIG. 12 assumes that a failure occurs in the MP 131 which is a target of the data transfer request in (2). The failure in the MP 131 includes, for example, removal of a substrate on which the corresponding MP 131 is mounted, a hang-up of the MP 131 itself, and the like. In this case, the MP 131 cannot perform data transfer (arrow (4)), and thus the ASIC 121 detecting the failure in the MP 131 because of a time-out of the data transfer processing notifies the BIF unit 140 to that effect (arrow (5)). At this time, the ASIC 121 sets a Poisoned TLP flag to on in TLP data to be transferred to the BIF unit 140 (EP=1, see FIG. 8). When the Poisoned TLP flag in the received TLP data is set to on, the BIF unit 140 can detect occurrence of a failure in the MP 131, not a failure in the internal data transfer path using PCIe.

Figure 13:
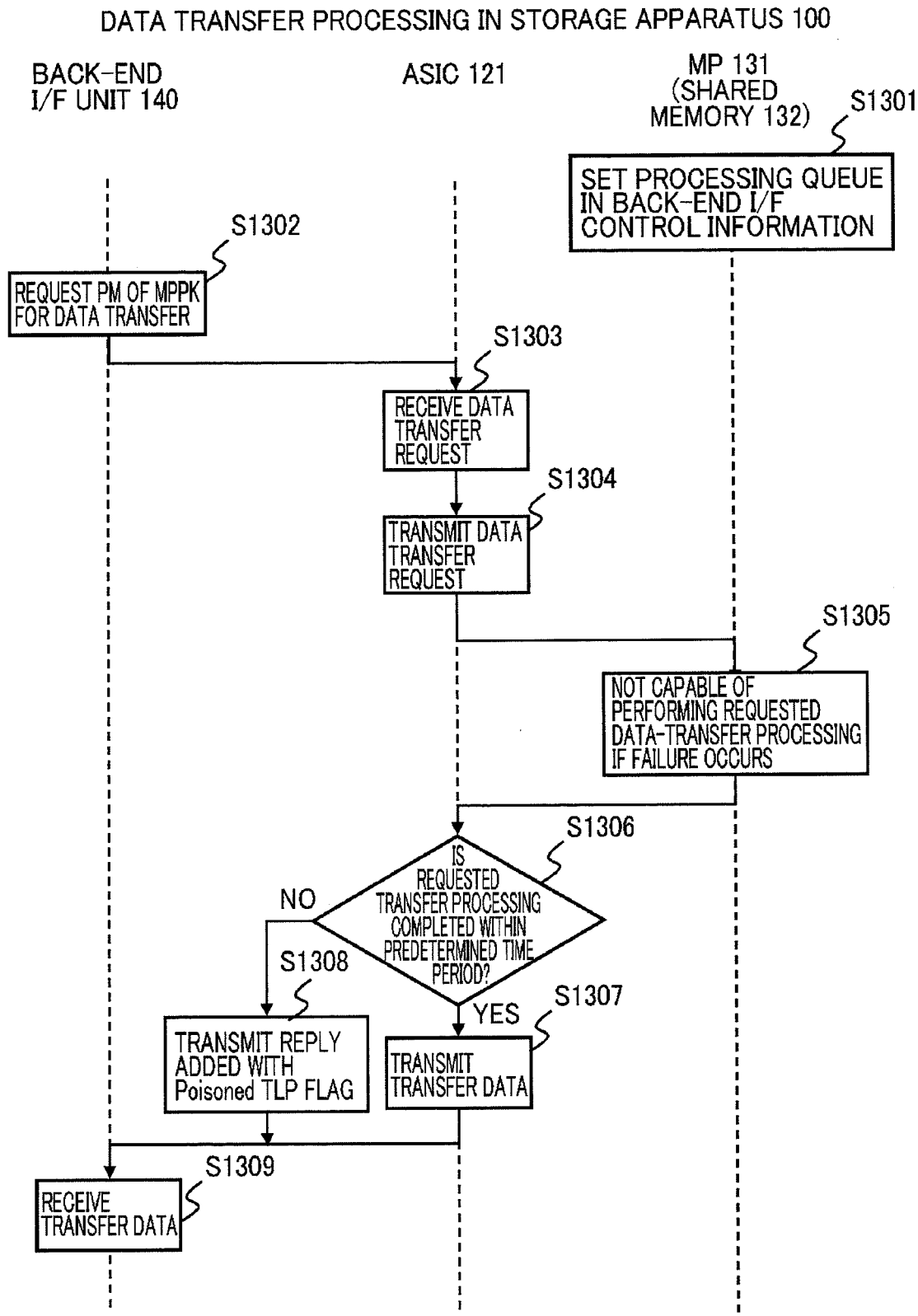
FIG. 13 is a flowchart showing an example of a flow of transfer processing of BIF control information.

Next, description is given in more detail of the data transfer processing shown in FIG. 12. FIG. 13 shows an example of an internal data transfer processing flow of the storage apparatus 100. FIG. 13 shows data transfer processing among the BIF unit 140, the ASIC 121, and the MPs 131. Firstly, one of the MPs 131 sets a processing request, whenever necessary, such as a read request or a write request in the request processing queue in the BIF control information arranged in the shared memory 132, in response to a data I/O request received from the host 200 via the FIF unit 110 and the ASIC 121 (S1301).

In contrast, the BIF unit 140 monitors a pointer of the processing request queue to acquire the storage state of the processing request queue of each MP 131 in S1301. At timing of storing a new processing request queue for the MP 131, the BIF unit 140 designates the target MP 131 for the ASIC 121 so as to access the processing request queue set in the BIF control information in the shared memory 132 of the MPPK 130, and executes a data transfer request (S1302). The ASIC 121 receiving the data transfer request from the BIF unit 140 transfers the data transfer request to the MPPK 130 (S1303 and S1304). When the MP 131 designated in the data transfer request operates normally in the MPPK 130, the MP 131 acquires a processing request queue of the MP 131 itself from the BIF control information in the shared memory 132 and transmits a processing request in the processing request queue to the ASIC 121. However, when a failure occurs in the pertinent MP 131, the MP 131 cannot perform data transfer to the ASIC 121 (S1305).

In contrast, the ASIC 121 transmits the data transfer request to the MP 131 in S1304 and thereafter monitors the data transfer from the MP 131. The ASIC 121 determines in this state whether requested transfer processing is completed (whether transfer data is received from the MP 131) within a predetermined time period (S1306). When determining that the requested transfer processing is completed within the predetermined time period (Yes in S1306), the ASIC 121 transmits the received transfer data to the BIF unit 140 (S1307). The BIF unit 140 receives the transfer data from the ASIC 121 and ends the series of data transfer processing (S1309). When the ASIC 121 determines that the transfer request processing is not completed within the predetermined time period (No in S1306), the ASIC 121 generates TLP data in which the Poisoned TLP flag is set to on and transmits the TLP data to the BIF unit 140 (S1308). When a failure occurs in any MP 131 in the MPPK 130 due to the data transfer processing, the BIF unit 140 can detect the occurrence of the failure from the reception of the TLP data having the Poisoned TLP flag from the ASIC 121.

Figure 14:
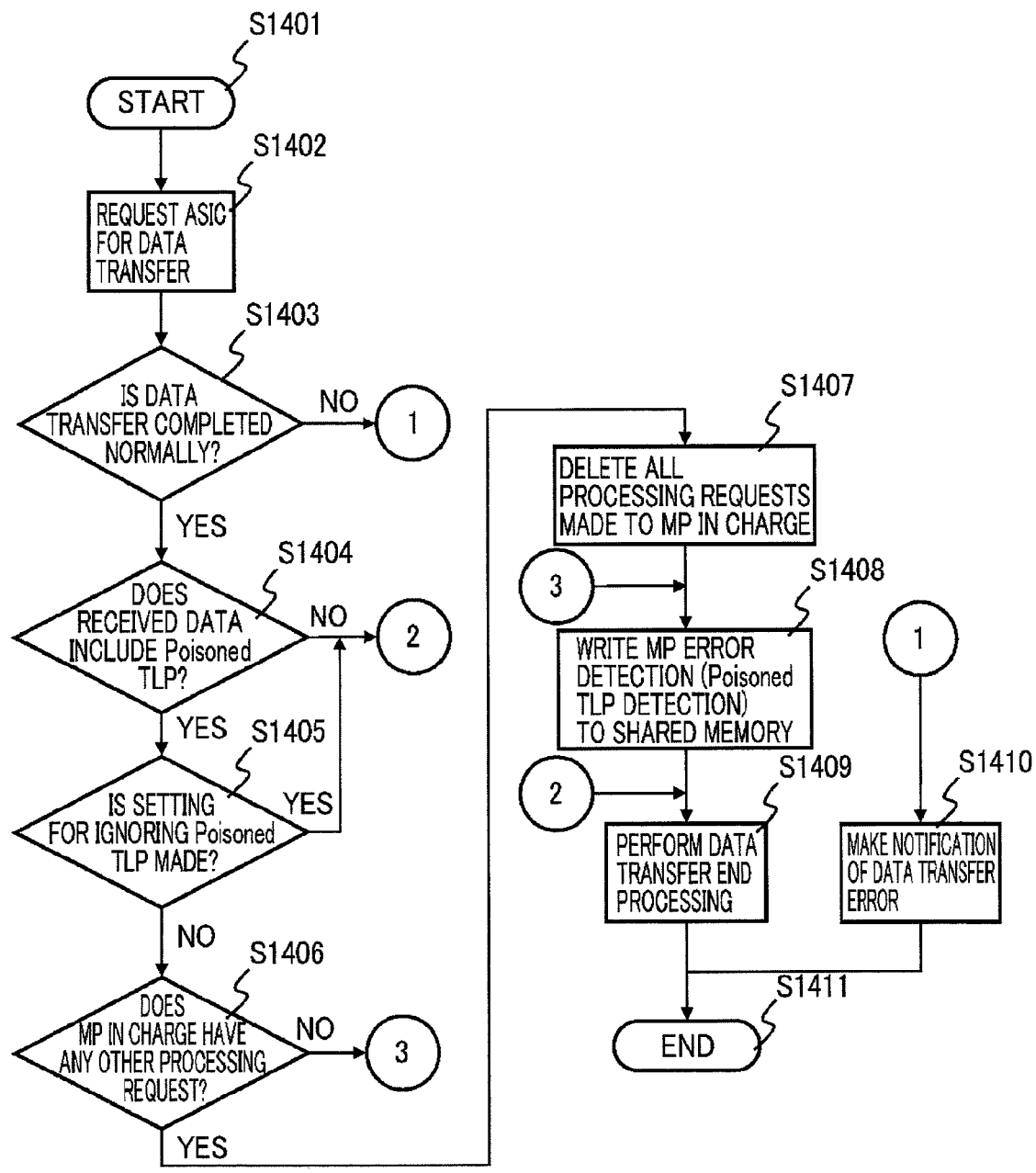
FIG. 14 is a flowchart showing an example of a flow of remedy processing for a BIF control information transfer failure.

Next, a description is given of a data processing flow executed by the BIF unit 140 in the data transfer processing in FIG. 13. FIG. 14 shows an example of a data-transfer-request result determination processing flow in the BIF unit 140. The BIF unit 140 executes data processing appropriate for the result received from the ASIC 121 in response to the data transfer request.

The BIF unit 140 starting processing in S1401 firstly requests the ASIC 121 for data transfer (S1402). Then, the BIF unit 140 determines whether the BIF unit 140 has received transfer data normally (S1403). When determining that the transfer data is not normally received (No in S1403), the BIF unit 140 transmits to the management apparatus 400 a notification indicating an error of data transfer processing between the BIF unit 140 and the ASIC 121 (S1410). Then, the BIF unit 140 ends the processing without any other processing (S1411). In this case, a remedy such as an attempt to reset the BIF unit 140 can be taken by using a management program of the management apparatus 400.

When determining that the BIF unit 140 has received the transfer data normally (Yes in S1403), the BIF unit 140 determines whether the Poisoned TLP flag is set to on in the received TLP data (S1404). When determining that the Poisoned TLP flag is not set to on (No in S1404), the BIF unit 140 performs data transfer end processing to end the processing (S1409 and S1411). When determining that the Poisoned TLP flag is on in the received TLP data (Yes in S1404), the BIF unit 140 determines whether setting is made to ignore the Poisoned TLP flag (S1405). When determining that the setting is made to ignore the Poisoned TLP flag (Yes in S1405), the BIF unit 140 performs the data transfer end processing to end the processing (S1409 and S1411). The setting for ignoring the Poisoned TLP flag can be made by using a method in which one of the MPs 131 sets the flag to on in the shared memory 132 on the basis of an instruction made from the management apparatus 400 via the SVP 160, before starting to operate the storage apparatus 100, for example.

When determining that the setting is not made to ignore the Poisoned TLP flag (No in S1405), the BIF unit 140 determines whether the MP 131 receiving the data transfer request has any other processing request (S1406). When determining that the MP 131 receiving the data transfer request has another processing request (Yes in S1406), the BIF unit 140 deletes (aborts) all the processing requests made to the MP 131 (S1407), records the detection of the failure in the MP 131 in the shared memory 132 of the MPPK 130 (S1408), and proceeds the processing to S1409. When determining that the MP 131 receiving the data transfer request does not have any other processing request (No in S1406), the BIF unit 140 proceeds the processing to S1408.

With the aforementioned data-transfer-request result determination processing in the BIF unit 140, even if the BIF control information is arranged in the shared memory 132 of the MPPK 130, a failure occurring in the MP 131 and a failure in data transfer between the BIF unit 140 and the ASIC 121 can be distinguished from each other. In the case of the failure in the MP 131, there is no need for executing processing of resetting the BIF unit 140 or the like which hinders data I/O processing on the storage drive 151, and thus the availability as the storage apparatus 100 is enhanced. In addition, it is possible to detect a failure in the MP 131 at an appropriate timing and thus to quickly start fail-over processing and the like on the MPPK 130. Moreover, the user can be notified of occurrence distinguished between failure in data transfer between the BIF unit 140 and the ASIC 121 and failure in the MP 131. Thus, the user can also be prompted to perform an appropriate operation for the failure.

Figure 15:
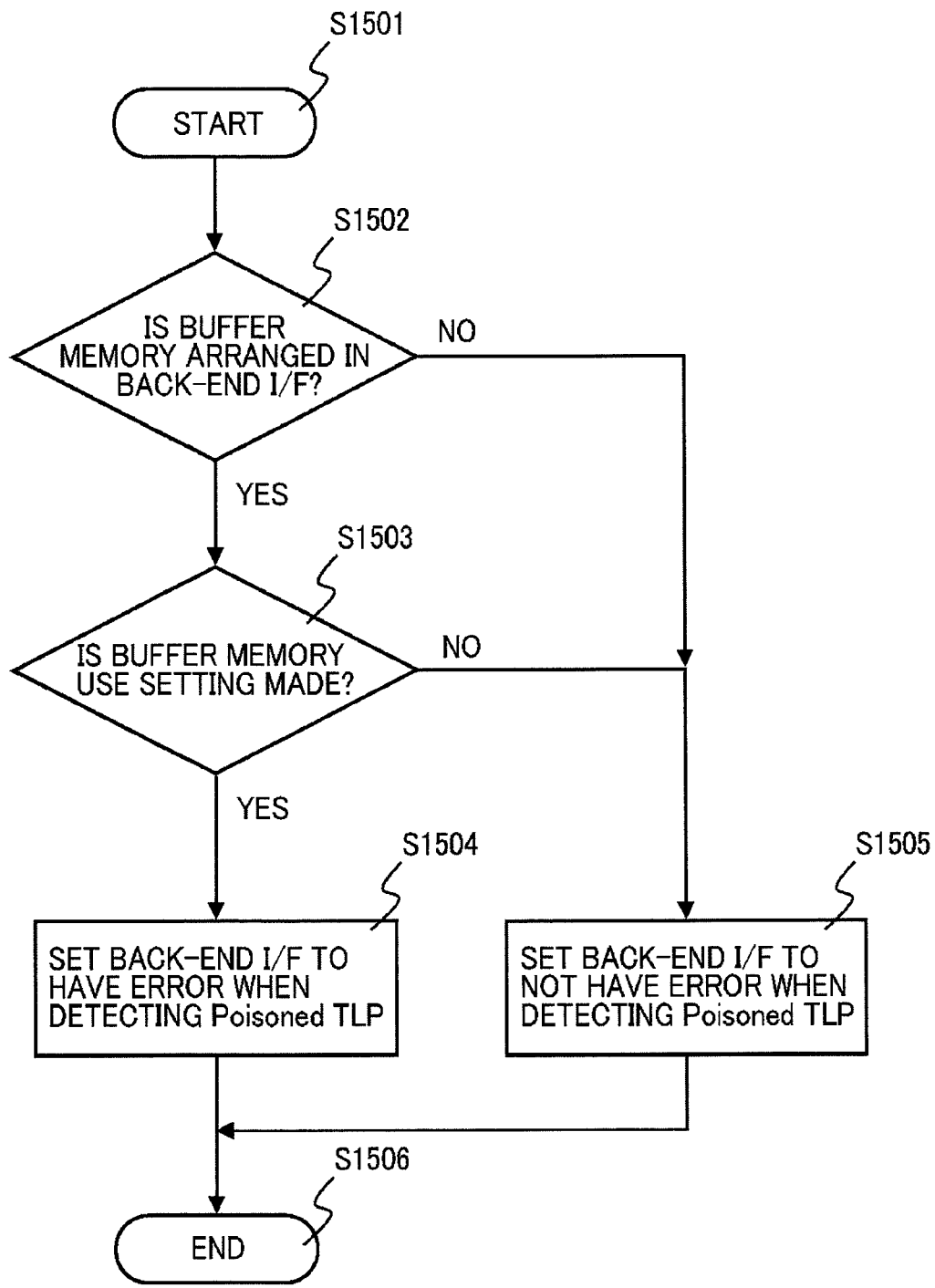
FIG. 15 is a flowchart showing an example of a processing flow of determining buffer memory use setting.

Next, description is given of processing to set the buffer memory use mode in the present embodiment. FIG. 15 shows an example of a processing flow of setting a buffer memory use mode. The processing in FIG. 15 is mainly executed by the management program 4300 in the management apparatus 400 using the MP 131 via the SVP 160. Firstly, when the processing starts in S1501, the MP 131 determines whether the buffer memory is arranged in the BIF unit 140 (S1502). When determining that the buffer memory is arranged in the BIF unit 140 (Yes in S1502), the MP 131 further determines whether buffer memory use setting is made (S1503). When determining that the buffer memory use setting is made (Yes in S1503), the MP 131 makes such setting in the shared memory 132 as to determine that the BIF unit 140 has an error when the BIF unit 140 detects the Poisoned TLP flag set to on. Then, the MP 131 ends the processing (S1504 and S1506). Whether the buffer memory is configured in the BIF unit 140 and whether the buffer memory configured in the BIF unit 140 is used can be determined by means of gathering the information by the MP 131, for example, when starting operation of the storage apparatus 100, and the determination result can be recorded in the shared memory 132.

On the other hand, when determining that the buffer memory is not arranged in the BIF unit 140 (No in S1502) or that the buffer memory use setting is not made (No in S1503), the MP 131 makes such setting in the shared memory 132 as to determine that the BIF unit 140 does not have an error even when the BIF unit 140 detects the Poisoned TLP flag set to on. Then, the MP 131 ends the processing (S1505 and S1506). In a case where the buffer memory is set to be used while being arranged in the BIF unit 140, the processing of setting a buffer memory use mode described above makes it possible to execute the following processing. Specifically, when it is determined that the Poisoned TLP flag is set to on in transfer data from the ASIC 121, data temporarily stored in the buffer memory is cleared, and thereby the BIF unit 140 is reset being determined as having a transfer data error. Note that each MP 131 may automatically make setting in the shared memory 132 as to whether or not to use the buffer memory provided in the BIF unit 140 according to the use status of the storage apparatus 100 such as the frequency of accesses from the host 200.

The embodiment of the present invention described above in detail can provide a storage apparatus and a method for controlling the storage apparatus which are capable of achieving both the enhancement of data transfer processing efficiency and enhancement of apparatus availability.

Description has been heretofore given of this embodiment. However, the above embodiment is presented only to facilitate understanding of the present invention, and thus not to provide limited interpretation of the present invention. The present invention can be modified or improved without departing from the gist thereof, and equivalents of the present invention are also included in the present invention.

The invention claimed is:

1. A storage apparatus including a storage medium for providing an external apparatus with a data storage area, the storage apparatus comprising:
   a processing unit including a plurality of processors and a shared memory for storing programs executed by the plurality of processors and configured such that the plurality of processors receive data I/O requests and store the data I/O requests in the shared memory as storage medium control information for the storage medium;
   a storage medium controller configured to execute data processing that writes or reads target data for a corresponding one of the data I/O processing requests to or from the storage medium on the basis of the storage medium control information stored in the shared memory; and
   a data transfer controller configured to execute data transfer processing between the processing unit and the storage medium controller in accordance with a predetermined communication method, wherein the data transfer controller is configured to transfer the data transfer request from the storage medium controller to the processing unit on a condition that the storage medium controller transmits a data transfer request to the data transfer controller, wherein:
   the data transfer controller is further configured to send, to the storage medium controller, data that includes predetermined error information stipulated for the predetermined communication method that writes or reads target data for a corresponding one of the data I/O processing requests to or from the storage medium, and
   the storage medium controller is further configured to determine, on a condition that the storage medium controller receives the predetermined error information, that a failure has occurred in the processor that is a target of a data transfer request that was transmitted to the data transfer controller.

2. The storage apparatus according to claim 1, wherein:
   the predetermined communication method is PCI Express, and
   the predetermined error information stipulated for the predetermined communication method is Poisoned TLP information.

3. The storage apparatus according to claim 1, wherein when determining that a failure has occurred in one of the plurality of processors, the storage medium controller discards a data transfer request held by the storage medium controller and to be processed by the one of the plurality of processors.

4. The storage apparatus according to claim 3, wherein the storage media controller notifies a management apparatus that the failure has occurred in the one of the plurality of processors, the management apparatus being communicatively coupled to the storage medium controller.

5. The storage apparatus according to claim 1, wherein when determining that a temporary storage area for storing data is configured in the storage medium controller and the temporary storage area is determined to be used as a place for storing the storage medium control information, the processing unit makes such setting in the shared memory that the storage medium controller has a failure when the storage medium controller detects the predetermined error information.

6. The storage apparatus according to claim 1, wherein when determining that a temporary storage area for storing data is not set in the storage medium controller or determining that the temporary storage area for storing data is set in the storage medium controller but the temporary storage area is not used as a place for storing the storage medium control information, the processing unit makes a setting in the shared memory so as not to determine that the storage medium controller has a failure even when the storage medium controller detects the predetermined error information.

7. A method for controlling a storage apparatus including a storage medium for providing an external apparatus with a data storage area, the storage apparatus further including
   a processing unit including a plurality of processors and a shared memory for storing programs executed by the plurality of processors and configured such that the plurality of processors receive data I/O requests and store the data I/O requests in the shared memory as storage medium control information for the storage medium,
   a storage medium controller configured to execute data processing that writes or reads target data for a corresponding one of the data I/O processing requests to or from the storage medium on the basis of the storage medium control information stored in the shared memory, and
   a data transfer controller configured to execute data transfer processing between the processing unit and the storage medium controller in accordance with a predetermined communication method, the predetermined communication method comprising:
   the data transfer controller transferring the data transfer request from the storage medium controller to the processing unit on a condition that the storage medium controller transmits a data transfer request to the data transfer controller,
   sending data, including predetermined error information, to the storage medium controller by the data transfer controller, the predetermined error information being stipulated for the predetermined communication method on a condition that the data transfer controller determines that the processing unit does not execute data transfer processing properly, and
   determining, by the storage medium controller, on a condition that the storage medium controller receives the predetermined error information, that a failure has occurred in the processor that is a target of a data transfer request that was transmitted to the data transfer controller.

8. The method for controlling a storage apparatus according to claim 7, wherein
   the predetermined communication method is PCI Express, and
   the predetermined error information stipulated for the predetermined communication method is Poisoned TLP information.

9. The method for controlling a storage apparatus according to claim 7, wherein
when determining that a failure has occurred in one of the plurality of processors, the storage medium controller discards a data transfer request held by the storage medium controller and is to be processed by the one of the plurality of processors.

10. The method for controlling a storage apparatus according to claim 9, wherein
the storage media controller notifies a management apparatus that the failure has occurred in the one of the plurality of processors, the management apparatus being communicatively coupled to the storage medium controller.

11. The method for controlling a storage apparatus according to claim 7, wherein
when determining that a temporary storage area for storing data is configured in the storage medium controller and the temporary storage area is determined to be used as a place for storing the storage medium control information, the processing unit makes such setting in the shared memory that the storage medium controller has a failure when the storage medium controller detects the predetermined error information.

12. The method for controlling a storage apparatus according to claim 7, wherein
when determining that a temporary storage area for storing data is not set in the storage medium controller or determining that the temporary storage area for storing data is set in the storage medium controller but the temporary storage area is not used as a place for storing the storage medium control information, the processing unit makes a setting in the shared memory so as not to determine that the storage medium controller has a failure even when the storage medium controller detects the predetermined error information.

13. A storage apparatus including a storage medium for providing an external apparatus with a data storage area, the storage apparatus comprising:
a processing unit including a plurality of processors and a shared memory for storing programs executed by the plurality of processors and is configured such that the plurality of processors receive data I/O requests and store the data I/O requests in the shared memory as storage medium control information for the storage medium;
a storage medium controller configured to execute data processing of writing or reading target data for a corresponding one of the data I/O processing requests to or from the storage medium on the basis of the storage medium control information stored in the shared memory; and
a data transfer controller configured to execute data transfer processing between the processing unit and the storage medium controller in accordance with a predetermined communication method, wherein:
the data transfer controller transfers the data transfer request from the storage medium controller to the processing unit on a condition that the storage medium controller transmits a data transfer request to the data transfer controller,
the data transfer controller sends, to the storage medium controller, data that includes predetermined error information stipulated for the predetermined communication method that writes or reads target data for a corresponding one of the data I/O processing requests to or from the storage medium, and
the storage medium controller determines, on a condition that the storage medium controller receives the predetermined error information, that a failure has occurred in the processor that is a target of a data transfer request that was transmitted to the data transfer controller,
the predetermined communication method is PCI Express,
the predetermined error information stipulated for the predetermined communication method is Poisoned TLP information,
when determining that a failure has occurred in one of the plurality of processors, the storage medium controller discards a data transfer request held by the storage medium controller and to be processed by the one of the plurality of processors,
the storage media controller notifies a management apparatus that the failure has occurred in the one of the plurality of processors, the management apparatus being communicatively coupled to the storage medium controller,
when determining that a temporary storage area for storing data is configured in the storage medium controller and the temporary storage area is determined to be used as a place for storing the storage medium control information, the processing unit makes such setting in the shared memory that the storage medium controller has a failure when the storage medium controller detects the predetermined error information, and
when determining that a temporary storage area for storing data is not set in the storage medium controller or determining that the temporary storage area for storing data is set in the storage medium controller but the temporary storage area is not used as a place for storing the storage medium control information, the processing unit makes a setting in the shared memory so as not to determine that the storage medium controller has a failure even when the storage medium controller detects the predetermined error information.

* * * * *